(12) United States Patent
Chen

(10) Patent No.: US 8,513,549 B2
(45) Date of Patent: Aug. 20, 2013

(54) ILLUMINATED KEYBOARD

(75) Inventor: Bo-An Chen, Taipei (TW)

(73) Assignee: Primax Electronics, Ltd., Taipei (TW)

( * ) Notice: Subject to any disclaimer, the term of this patent is extended or adjusted under 35 U.S.C. 154(b) by 240 days.

(21) Appl. No.: 13/105,629

(22) Filed: May 11, 2011

(65) Prior Publication Data

US 2012/0247936 A1    Oct. 4, 2012

(30) Foreign Application Priority Data

Apr. 1, 2011   (TW) .............................. 100111563 A

(51) Int. Cl.
*H01H 9/26* (2006.01)
*H01H 13/72* (2006.01)
*H01H 13/76* (2006.01)

(52) U.S. Cl.
USPC ....................................... 200/5 A

(58) Field of Classification Search
USPC ................. 200/5 R, 5 A, 46, 406, 511–514, 200/520–521, 308, 310–314, 317, 337, 341, 200/345
See application file for complete search history.

(56) References Cited

U.S. PATENT DOCUMENTS

| | | | | |
|---|---|---|---|---|
| 6,057,517 A * | 5/2000 | Meyer | ............................ | 200/5 A |
| 6,917,000 B2 * | 7/2005 | Yen | ............................... | 200/5 A |
| 7,608,792 B1 * | 10/2009 | Tsai | ............................... | 200/310 |
| 7,952,043 B2 * | 5/2011 | Lin | ............................... | 200/310 |
| 8,110,765 B2 * | 2/2012 | Marcus et al. | ................ | 200/512 |
| 2010/0128427 A1 * | 5/2010 | Iso | ........................... | 361/679.09 |

* cited by examiner

*Primary Examiner* — Edwin A. Leon
*Assistant Examiner* — Anthony R. Jimenez
(74) *Attorney, Agent, or Firm* — Kirton McConkie; Evan R. Witt

(57) ABSTRACT

An illuminated keyboard includes a main circuit board, a membrane switch circuit module and an illumination circuit board. The membrane switch circuit module includes a first connecting zone and a bus bar. Through the bus bar, the membrane switch circuit module is connected with the main circuit board. The illumination circuit board includes a second connecting zone. The second connecting zone and the first connecting zone are connected with each other. Consequently, the illumination circuit board is electrically connected with the main circuit board through the second connecting zone, the first connecting zone and the bus bar.

16 Claims, 9 Drawing Sheets

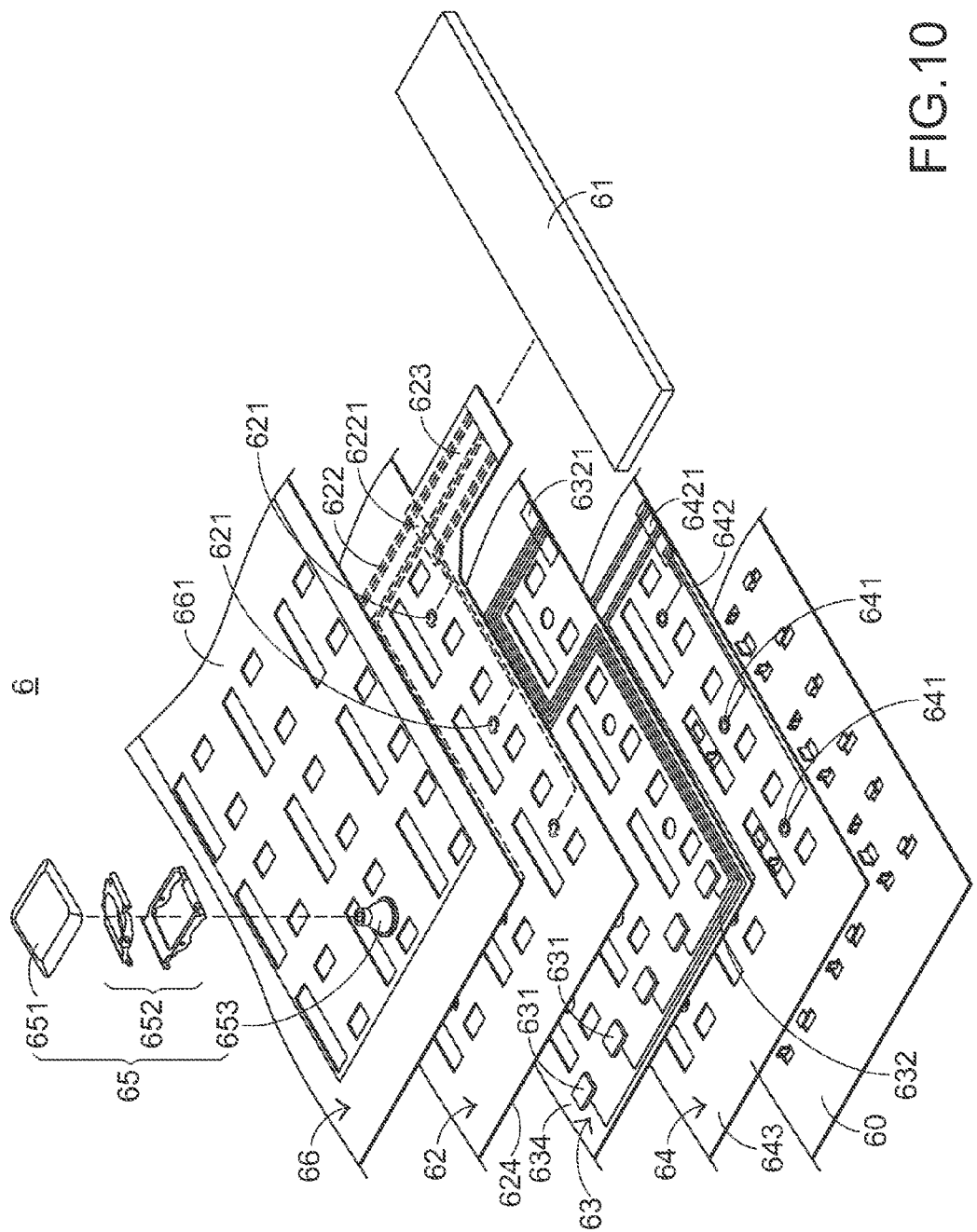

ILLUMINATED KEYBOARD

FIELD OF THE INVENTION

The present invention relates to a keyboard, and more particularly to an illuminated keyboard with an illuminating function.

BACKGROUND OF THE INVENTION

First of all, the configurations and functions of a conventional keyboard will be illustrated with reference to FIG. 1. FIG. 1 is a schematic top view illustrating the outward appearance of a conventional keyboard. The surface of the conventional keyboard 1 includes plural keys. These keys 10 are classified into several types, e.g. ordinary keys 101, numeric keys 102 and function keys 103. When one or more keys are depressed by a user, a corresponding signal is issued to the computer, and thus the computer executes a function corresponding to the depressed key or keys. For example, when an ordinary key 101 is depressed, a corresponding English letter or symbol is inputted into the computer. When a numeric key 102 is depressed, a corresponding number is inputted into the computer. In addition, the function keys 102 (F1~F12) can be programmed to cause corresponding application programs to provide certain functions.

With the maturity of computing technologies, the conventional keyboard that has basic functions fails to meet the users' requirements. For this reason, the keyboard manufacturers make efforts in designing novel keyboards with diversified functions. Recently, an illuminated keyboard with an illuminating function has been disclosed. Since the outward appearance of the conventional illuminated keyboard is similar to the outward appearance of the conventional keyboard 1, only the inner structure of the conventional illuminated keyboard will be illustrated in more details as follows. FIG. 2 is a schematic exploded view illustrating a portion of a conventional illuminated keyboard. As shown in FIG. 2, the conventional illuminated keyboard 2 comprises at least one key 20, a metallic base plate 21, a membrane switch circuit module 22, a elastic film 23, an illumination switch circuit module 24 and a main circuit board 25. For clarification and brevity, only one key 20 is shown in the drawing. The key 20 comprises a keycap 201, a scissors-type connecting element 202 and an elastic element 203. From top to bottom, the keycap 201, the scissors-type connecting element 202, the elastic element 203, the elastic film 23, the illumination switch circuit module 24, the membrane switch circuit module 22 and the metallic base plate 21 of the conventional illuminated keyboard 2 are sequentially shown. The main circuit board 25 is disposed beside the membrane switch circuit module 22.

In the key 20, the keycap 201 is exposed outside the top surface of illuminated keyboard 2 to be depressed by a user, the scissors-type connecting element 202 is used for connecting the keycap 201 with the metallic base plate 21, and the elastic element 203 is penetrated through the scissors-type connecting element 202 and contacted with the keycap 201 and the membrane switch circuit module 22. Corresponding to plural keys 20, the membrane switch circuit module 22 comprises plural electrical contacts 221, a first trace pattern 222 and a first bus bar 223. The first trace pattern 222 is connected with the plural electrical contacts 221 and the first bus bar 223. The first bus bar 223 is also connected with the main circuit board 25. When one of the plural electrical contacts 221 is depressed, a corresponding signal is generated and transmitted to the main circuit board 25 through the first trace pattern 222 and the first bus bar 223. In addition, the electricity required for operations of the membrane switch circuit module 22 is also provided through the first trace pattern 222 and the first bus bar 223.

The elastic film 23 is arranged between the elastic element 203 and the membrane switch circuit module 22 for fixing the elastic element 203 thereon. The elastic film 23 comprises a light-shielding layer 231. The elastic element 203 is fixed on the elastic film 23 through an adhesive (not shown). For example, the elastic element 203 is made of a plastic rubbery material. The illumination switch circuit module 24 comprises plural light sources 241, a second trace pattern 242 and a second bus bar 243. The light sources 241 are used for emitting light beams. The second trace pattern 242 is connected with the light sources 241 and the second bus bar 243. The second bus bar 243 is also connected with the main circuit board 25 for receiving electricity. The electricity is transmitted to the light sources 241 through the second bus bar 243 and the second trace pattern 242 to power the light source 241, so that the light sources 241 can emit the light beams.

The internal configurations of the conventional illuminated keyboard 2 are substantially identical to those of the conventional keyboard 1 except that the conventional illuminated keyboard 2 further comprises the illumination switch circuit module 24. For producing the conventional illuminated keyboard 2, the keyboard manufacturer may assemble an additional illumination switch circuit module 24 to the conventional keyboard 1. That is, the conventional keyboard 1 may transmit signals and electricity by connecting the first bus bar 223 with the main circuit board 25. However, the conventional illuminated keyboard 2 is allowed to transmit signals and electricity by connecting the first bus bar 223 and the second bus bar 243 with the main circuit board 25. Due to the additional illumination switch circuit module 24 of the conventional illuminated keyboard 2, the second trace pattern 242 should be connected with the second bus bar 243 while being kept away from the first trace pattern 222. Under this circumstance, since the circuitry layout of the conventional illuminated keyboard 2 is complicated, it is difficult to design the circuitry of the conventional illuminated keyboard 2.

SUMMARY OF THE INVENTION

The present invention provides an illuminated keyboard with simplified circuitry layout.

The present invention also provides an illuminated keyboard with low fabricating cost.

The present invention further provides an illuminated keyboard with reduced internal height.

In accordance with an aspect of the present invention, there is provided an illuminated keyboard. The illuminated keyboard includes a main circuit board, an illumination circuit board and at least one key. The membrane switch circuit module is connected with the main circuit board, and includes at least one key intersection, a first trace pattern and a bus bar. When the key intersection is triggered, a key signal is generated. The first trace pattern is connected with the key intersection and has a first connecting zone. The bus bar is connected with the main circuit board and the first trace pattern. The illumination circuit board is stacked on the membrane switch circuit module and includes at least one light source and a second trace pattern. The light source is disposed on a first surface of the illumination circuit board for emitting light beams. The second trace pattern is disposed on the first surface of the illumination circuit board and connected with the light source. The second trace pattern has a second connecting zone. The at least one key is disposed over the membrane switch circuit module and aligned with the at least one key intersection. When the at least one key is depressed, the membrane switch circuit module is triggered. The first connecting zone and the second connecting zone are in contact with each other, so that electricity is transmitted to the illumination circuit board through the bus bar, the first trace pattern and the second trace pattern.

In an embodiment, the membrane switch circuit module and the illumination circuit board are combined together by a thermal compression process, so that the first connecting zone and the second connecting zone are jointed together.

In an embodiment, the illuminated keyboard further includes a conductive film, which is disposed on the first connecting zone or the second connecting zone. During the membrane switch circuit module and the illumination circuit board are combined together by a thermal compression process, the conductive film is thermally molten, so that the first connecting zone and the second connecting zone are jointed together via the conductive film.

In an embodiment, the illuminated keyboard further includes a elastic film. The illumination circuit board further includes a light-shielding layer. The illumination circuit board is disposed on a second surface of the illumination circuit board for avoiding light leakage, and the elastic film is disposed on the light-shielding layer.

In an embodiment, the illuminated keyboard further includes a base plate for supporting the membrane switch circuit module and the at least one key. Moreover, the at least one key includes at least one keycap, at least one scissors-type connecting element and at least one elastic element. The at least one keycap is exposed to a surface of the illuminated keyboard. The at least one scissors-type connecting element is arranged between the base plate and the at least one keycap for connecting the base plate with the at least one keycap, and allowing the at least one keycap to be moved upwardly and downwardly with respect to the base plate. The at least one elastic element is disposed on a second surface of the illumination circuit board. When the at least one keycap is depressed, the at least one elastic element is compressed to push against the membrane switch circuit module, so that the membrane switch circuit module is triggered. Whereas, when a depressing force exerted on the at least one keycap is eliminated, an elastic force provided by the at least one elastic element is acted on the at least one keycap, so that the at least one keycap is returned to an original position.

In an embodiment, the membrane switch circuit module further includes an upper wiring board, a lower wiring board and a partition plate. The upper wiring board has at least one upper contact. The first trace pattern, the first connecting zone and the bus bar are disposed on the upper wiring board. The lower wiring board is arranged at a side of the upper wiring board, and includes at least one lower contact corresponding to the at least one upper contact and a third trace pattern. The at least one upper contact and the at least one lower contact collectively define the at least one key intersection. When the membrane switch circuit module is depressed, the upper contact and the lower contact are contacted with each other, so that the key signal is generated. The third trace pattern further includes a third connecting zone. The third connecting zone and the first connecting zone are in contact with each other, so that a connection loop between the upper wiring board and the lower wiring board is established. The partition plate is arranged between the upper wiring board and the lower wiring board, and has at least one perforation corresponding to the at least one upper contact. When the membrane switch circuit module is depressed, the at least one upper contact is inserted into the perforation.

In an embodiment, the membrane switch circuit module further includes an upper wiring board, a lower wiring board and a partition plate. The upper wiring board has at least one upper contact and a third trace pattern. The third trace pattern has a third connecting zone. The lower wiring board is arranged at a side of the upper wiring board, and includes least one lower contact corresponding to the at least one upper contact. The at least one upper contact and the at least one lower contact collectively define the at least one key intersection. When the membrane switch circuit module is depressed, the upper contact and the lower contact are contacted with each other, so that the key signal is generated. The third trace pattern further comprises a third connecting zone. The third connecting zone and the first connecting zone are in contact with each other, so that a connection loop between the upper wiring board and the lower wiring board is established. The partition plate is arranged between the upper wiring board and the lower wiring board, and has at least one perforation corresponding to the at least one upper contact. When the membrane switch circuit module is depressed, the at least one upper contact is inserted into the perforation.

In accordance with another aspect of the present invention, there is provided an illuminated keyboard. The illuminated keyboard includes a main circuit board, a first wiring board, a second wiring board, an illumination circuit board and at least one key. The first wiring board includes at least one first contact, a first trace pattern and a bus bar. The first trace pattern has a first connecting zone. The first contact and the first trace pattern are connected with the bus bar. The bus bar is connected with the main circuit board. The second wiring board is disposed at a side of the first wiring board and has a second contact corresponding to the first contact. When the first wiring board or the second wiring board is depressed, the second contact is contacted with the first contact. The illumination circuit board is arranged between the first wiring board and the second wiring board. The illumination circuit board, the first wiring board and the second wiring board collectively define a membrane switch circuit module. The illumination circuit board includes at least one perforation corresponding to the first contact, at least one light source and a second trace pattern. When the membrane switch circuit module is depressed, the first contact or the second contact is inserted into the perforation. The light source is disposed on a first surface of the illumination circuit board for emitting light beams. The second trace pattern is disposed on the first surface of the illumination circuit board and connected with the light source. The second trace pattern has a second connecting zone. The at least one key is disposed over the first wiring board and aligned with the at least one first contact. When the key is depressed, the first wiring board is triggered. The first connecting zone and the second connecting zone are in contact with each other, so that electricity is transmitted to the illumination circuit board through the bus bar, the first trace pattern and the second trace pattern.

In an embodiment, the first wiring board and the illumination circuit board are combined together by a thermal compression process, so that the first connecting zone and the second connecting zone are jointed together.

In an embodiment, the illuminated keyboard further includes a conductive film, which is disposed on the first connecting zone or the second connecting zone. During the first wiring board and the illumination circuit board are combined together by the thermal compression process, the conductive film is thermally molten, so that the first connecting zone and the second connecting zone are jointed together via the conductive film.

In an embodiment, the second wiring board further includes a third trace pattern. The third trace pattern has a third connecting zone. The third connecting zone and the first connecting zone are in contact with each other, so that a connection loop between the first wiring board and the second wiring board is established. The first wiring board is an upper wiring board, and the second wiring board is a lower wiring board.

In an embodiment, the second wiring board further includes a third trace pattern. The third trace pattern has a third connecting zone. The third connecting zone and the first connecting zone are in contact with each other, so that a connection loop between the first wiring board and the second wiring board is established. The first wiring board is a lower wiring board, and the second wiring board is an upper wiring board.

In an embodiment, the illuminated keyboard further includes a base plate for supporting the first wiring board, the second wiring board and the at least one key. The at least one key includes at least one keycap, at least one scissors-type connecting element and at least one elastic element. The at least one keycap is exposed to a surface of the illuminated keyboard. The at least one scissors-type connecting element is arranged between the base plate and the at least one keycap for connecting the base plate with the at least one keycap, and allowing the at least one keycap to be moved upwardly and downwardly with respect to the base plate. The at least one elastic element is disposed on a elastic film of the illuminated keyboard. When the at least one keycap is depressed, the at least one elastic element is compressed to push against the first wiring board or the second wiring board, so that the first wiring board or the second wiring board is triggered. When a depressing force exerted on the at least one keycap is eliminated, an elastic force provided by the at least one elastic element is acted on the at least one keycap, so that the at least one keycap is returned to an original position.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 10 is a schematic exploded view illustrating a portion of an illuminated keyboard according to a fourth embodiment of the present invention.

DETAILED DESCRIPTION OF THE PREFERRED EMBODIMENT

Figure 1:
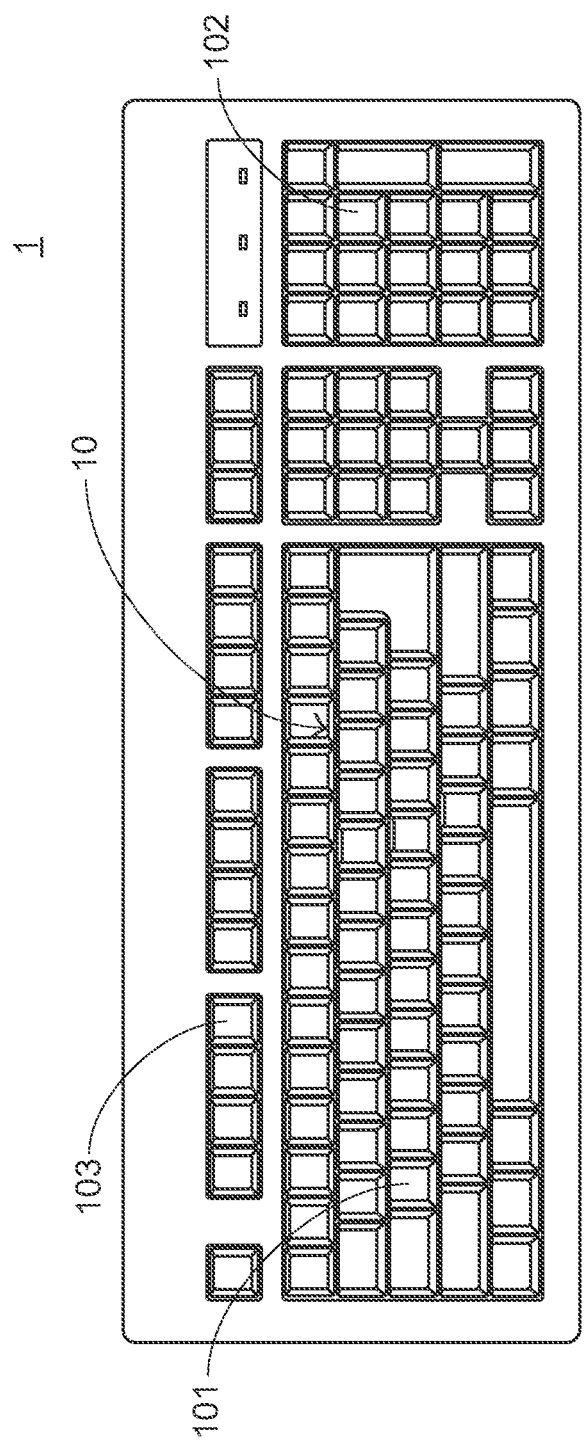
FIG. 1 is a schematic top view illustrating the outward appearance of a conventional keyboard.
Figure 2:
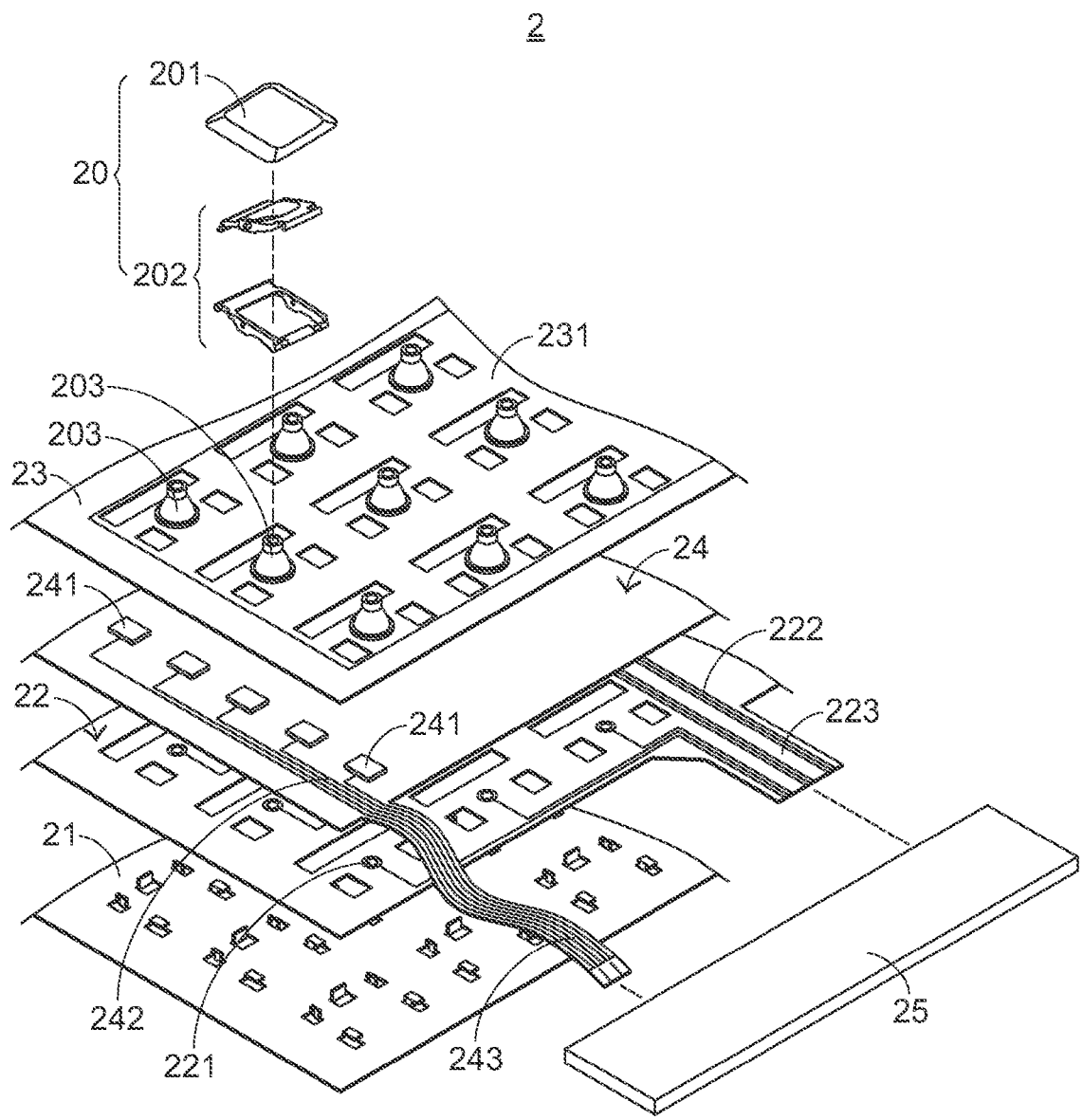
FIG. 2 is a schematic exploded view illustrating a portion of a conventional illuminated keyboard.
Figure 3:
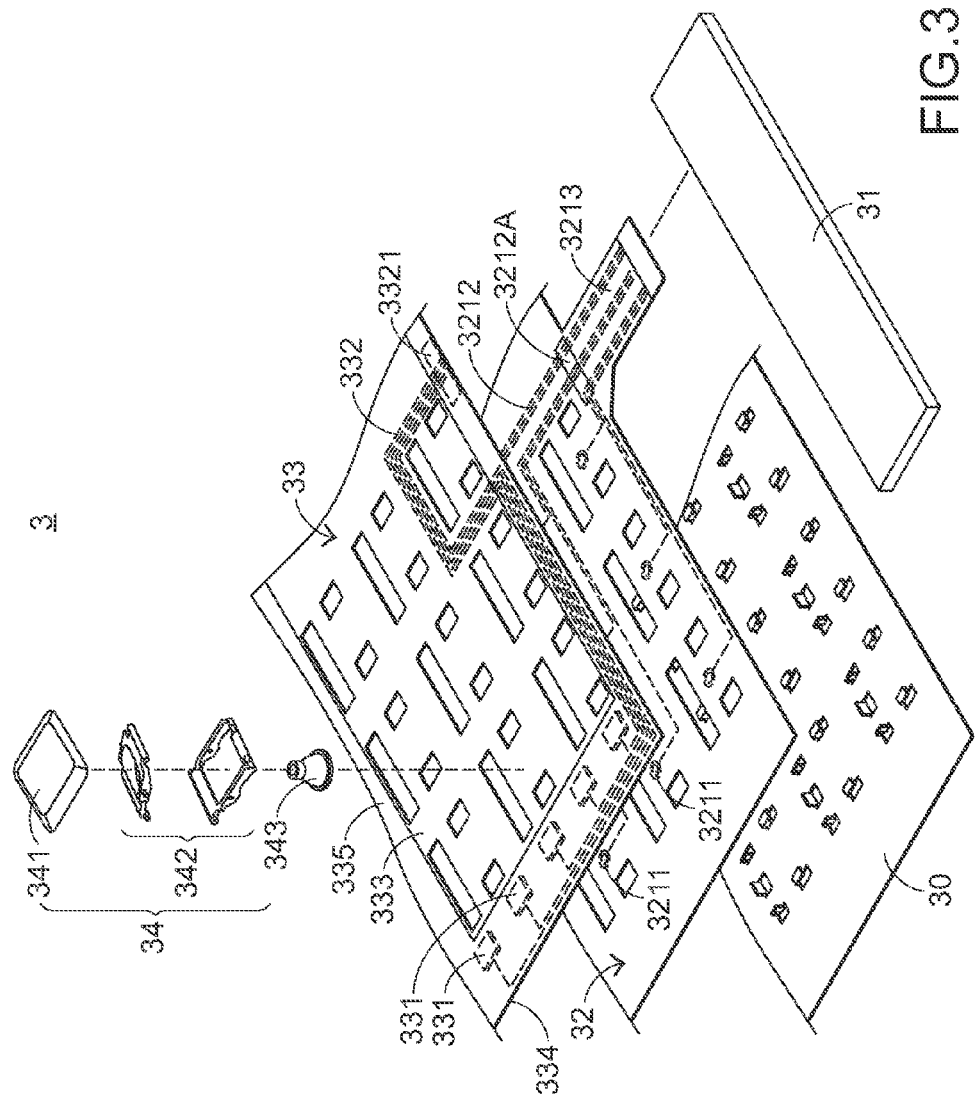
FIG. 3 is a schematic exploded view illustrating a portion of an illuminated keyboard according to a first embodiment of the present invention.

For obviating the drawbacks encountered from the prior art, the present invention provides illuminated keyboard. FIG. 3 is a schematic exploded view illustrating a portion of an illuminated keyboard according to a first embodiment of the present invention. As shown in FIG. 3, the illuminated keyboard 3 comprises a base plate 30, a main circuit board 31, a membrane switch circuit module 32, an illumination circuit board 33 and plural keys 34. For clarification and brevity, only one key 34 is shown in the drawing. The base plate 30 is disposed under the membrane switch circuit module 32, the illumination circuit board 33 and the plural keys 34 for supporting the membrane switch circuit module 32, the illumination circuit board 33 and the plural keys 34. The key 34 comprises a keycap 341, a scissors-type connecting element 342 and an elastic element 343. The keycap 341 is exposed outside the top surface of illuminated keyboard 3 to be depressed by a user. The scissors-type connecting element 342 is arranged between the keycap 341 and the illumination circuit board 33 for connecting the keycap 341 with the base plate 30. The elastic element 343 is arranged between the keycap 341 and the illumination circuit board 33. When the keycap 341 is depressed, the elastic element 343 is moved downwardly to push against the illumination circuit board 33, so that the membrane switch circuit module 32 under the illumination circuit board 33 is triggered. In this embodiment, the illumination circuit board 33 is an illumination switch circuit module, and the elastic element 343 is made of a plastic rubbery material.

The illumination circuit board 33 is stacked on the membrane switch circuit module 32, and arranged over the membrane switch circuit module 32. The illumination circuit board 33 comprises plural light sources 331, a second trace pattern 332 and a light-shielding layer 333. The plural light sources 331 are disposed on a first surface 334 of the illumination circuit board 33 for emitting light beams (not shown). The second trace pattern 332 is also disposed on the first surface 334 of the illumination circuit board 33 and electrically connected with the light sources 331. The second trace pattern 332 has a second connecting zone 3321. The light-shielding layer 333 is disposed on a second surface 335 of the illumination circuit board 33 for avoiding leakage of the light beams from the region between any two adjacent keycaps 341 (i.e. a so-called light leakage phenomenon). The elastic element 343 is disposed on the light-shielding layer 333. In this embodiment, the first surface 334 and the second surface 335 are the top surface and the bottom surface of the illumination circuit board 33, respectively. Moreover, the main circuit board 31 is disposed beside the membrane switch circuit module 32 and connected with the membrane switch circuit module 32.

After the above components are combined together, the illuminated keyboard 3 is assembled. When the keycap 341 is depressed by a user, the scissors-type connecting element 342 is switched to a folded state in response to the depressing force, so that the keycap 341 is moved upwardly and downwardly with respect to the base plate 30. At the same time, the elastic element 343 is compressed to push against the illumination circuit board 33, so that a corresponding key intersection of the membrane switch circuit module 32 under the illumination circuit board 33 is triggered. Whereas, when the depressing force exerted on the key 341 is eliminated, an elastic force provided by the elastic element 343 is acted on the keycap 341. Due to the elastic force, the keycap 341 is returned to its original position.

Figure 4:
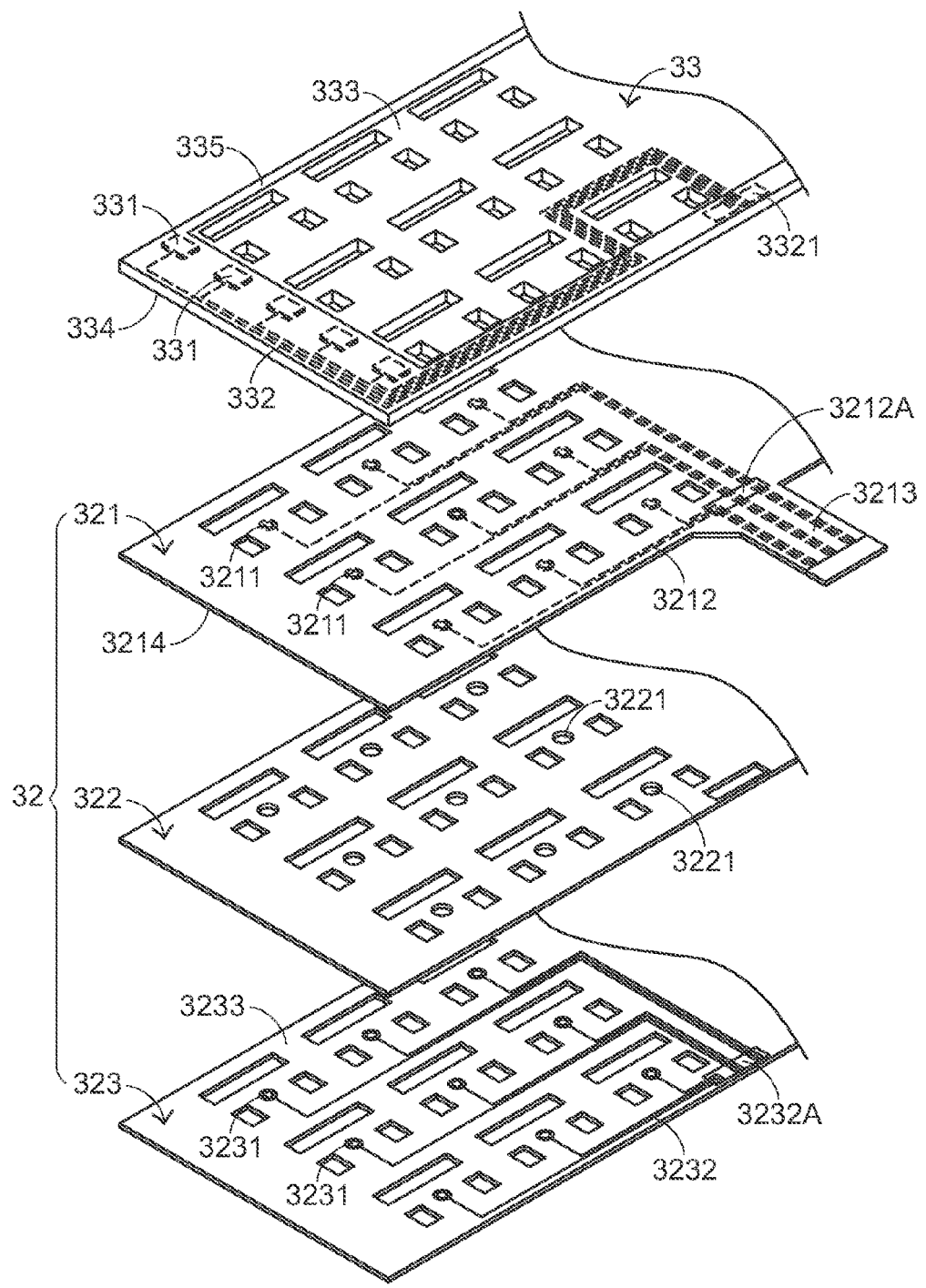
FIG. 4 is a schematic exploded view illustrating the membrane switch circuit module and the illumination circuit board of the illuminated keyboard according to the first embodiment of the present invention.

Hereinafter, the configurations of the membrane switch circuit module 32 will be illustrated with reference to FIG. 4. FIG. 4 is a schematic exploded view illustrating the membrane switch circuit module and the illumination circuit board of the illuminated keyboard according to the first embodiment of the present invention. The membrane switch circuit module 32 comprises an upper wiring board 321, a partition plate 322 and a lower wiring board 323. The upper wiring board 321 comprises plural upper contacts 3211, a first trace pattern 3212 and a bus bar 3213. Since the plural upper contacts 3211 and the first trace pattern 3212 are disposed on a bottom surface 3214 of the upper wiring board 321, the plural upper contacts 3211 and the first trace pattern 3212 are indicated as dotted lines in FIG. 4. The first trace pattern 3212 is connected with the plural upper contacts 3211. In addition, the first trace pattern 3212 has a first connecting zone 3212A. The bus bar 3213 is connected with the main circuit board 31 and the first trace pattern 3212. The lower wiring board 323 is arranged at a side of the upper wiring board 321. The lower wiring board 323 has plural lower contacts 3231 corresponding to respective upper contacts 3211. The lower wiring board 323 also includes a third trace pattern 3232. The plural lower contacts 3231 and the third trace pattern 3232 are disposed on a top surface 3233 of the lower wiring board 323. Each lower contact 3231 and the corresponding upper contact 3211 collectively define a key intersection. When the membrane switch circuit module 32 is depressed, the lower contact 3231 and the corresponding upper contact 3211 are contacted with each other, and thus a key signal is generated. The third trace pattern 3232 has a third connecting zone 3232A. The location of the third connecting zone 3232A corresponds to the location of the first connecting zone 3212A of the upper wiring board 321. The third connecting zone 3232A and the first connecting zone 3212A are in contact with each other, so that a connection loop (not shown) between the upper wiring board 321 and the lower wiring board 323 is established. On the other hand, the location of the second connecting zone 3321 of the illumination circuit board 33 corresponds to the location of first connecting zone 3212A of the upper wiring board 321. The partition plate 322 is arranged between the upper wiring board 321 and the lower wiring board 323. The partition plate 322 has plural perforations 3221 corresponding to the plural upper contacts 3211. When the membrane switch circuit module 32 is depressed, the upper contact 3211 is inserted into a corresponding perforation 3221.

Figure 5:
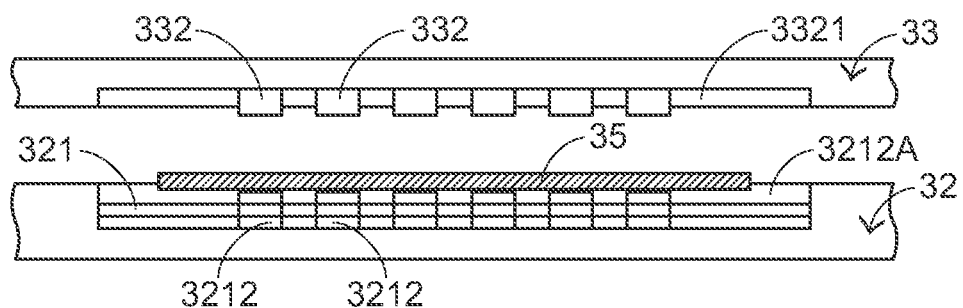
FIG. 5 is a schematic side view illustrating the membrane switch circuit module and the illumination circuit board of the illuminate keyboard to be combined together according to the first embodiment of the present invention.
Figure 6:
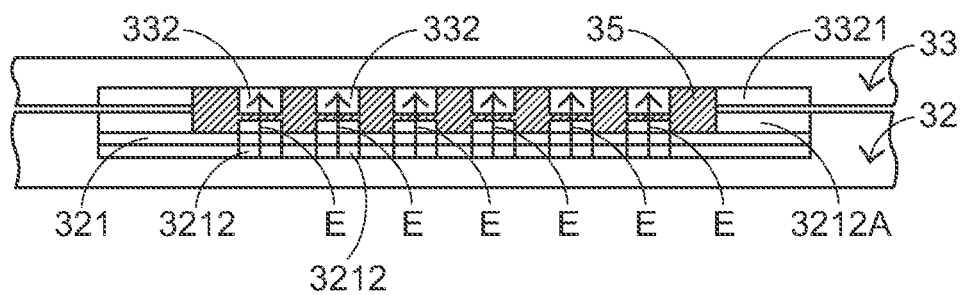
FIG. 6 is a schematic side view illustrating a combination of the membrane switch circuit module and the illumination circuit board of the illuminate keyboard according to the first embodiment of the present invention.

Hereinafter, a process of combining the membrane switch circuit module 32 with the illumination circuit board 33 will be illustrated with reference to FIGS. 5 and 6. FIG. 5 is a schematic side view illustrating the membrane switch circuit module and the illumination circuit board of the illuminate keyboard to be combined together according to the first embodiment of the present invention. As shown in FIG. 5, the upper wiring board 321, the partition plate 322 and the lower wiring board 323 are assembled as the membrane switch circuit module 32. The illumination circuit board 33 is stacked on the membrane switch circuit module 32 via a conductive film 35. The conductive film 35 is attached on the first connecting zone 3212A of the membrane switch circuit module 32. An example of the conductive film 35 is an anisotropic conductive film (ACF). In addition, the membrane switch circuit module 32 and the illumination circuit board 33 are combined together by a thermal compression process.

For combining membrane switch circuit module 32 and the illumination circuit board 33, the membrane switch circuit module 32 and the illumination circuit board 33 are subject to a thermal compression process. In such way, the conductive film 35 on the first connecting zone 3212A of the membrane switch circuit module 32 is thermally molten, so that the first connecting zone 3212A of the membrane switch circuit module 32 and the second connecting zone 3321 of the illumination circuit board 33 are jointed together via the molten conductive film 35. Meanwhile, the first trace pattern 3212 of the membrane switch circuit module 32 and the second trace pattern 332 of the illumination circuit board 33 are electrically connected with each other (see FIG. 6). Under this circumstance, the electricity E required for operations of the illumination circuit board 33 can be transmitted to the plural light sources 331 through the main circuit 31 (see FIG. 3), the bus bar 3213, the first trace pattern 3212 (including the first connecting zone 3212A) and the second trace pattern 332 (including the second connecting zone 3321).

From the above discussions, in the illuminated keyboard 3 of this embodiment, the second connecting zone 3321 is disposed on the illumination circuit board 33. By connecting the first connecting zone 3212A of the membrane switch circuit module 32 with the second connecting zone 3321 of the illumination circuit board 33, the membrane switch circuit module 32 and the illumination circuit board 33 are combined together. In such way, since it is not necessary to install an additional bus bar on the illumination circuit board 33 to connect with the main circuit board 31, the fabricating cost of the illuminated keyboard 3 is reduced. Moreover, since the second trace pattern 332 is connected with the membrane switch circuit module 32 rather than the bus bar, the bus bar is collectively used by the membrane switch circuit module 32 and the illumination circuit board 33. In such way, the circuitry layout of the illumination circuit board 33 is simplified. In this embodiment, the elastic film for fixing the elastic element 343 is not included in the illuminated keyboard 3 of this embodiment. Whereas, the function of the elastic film is integrated into the illumination circuit board 33. Since the illuminated keyboard 3 saves the thickness of the elastic film, the overall internal height of the illuminated keyboard 3 is reduced.

Figure 7:
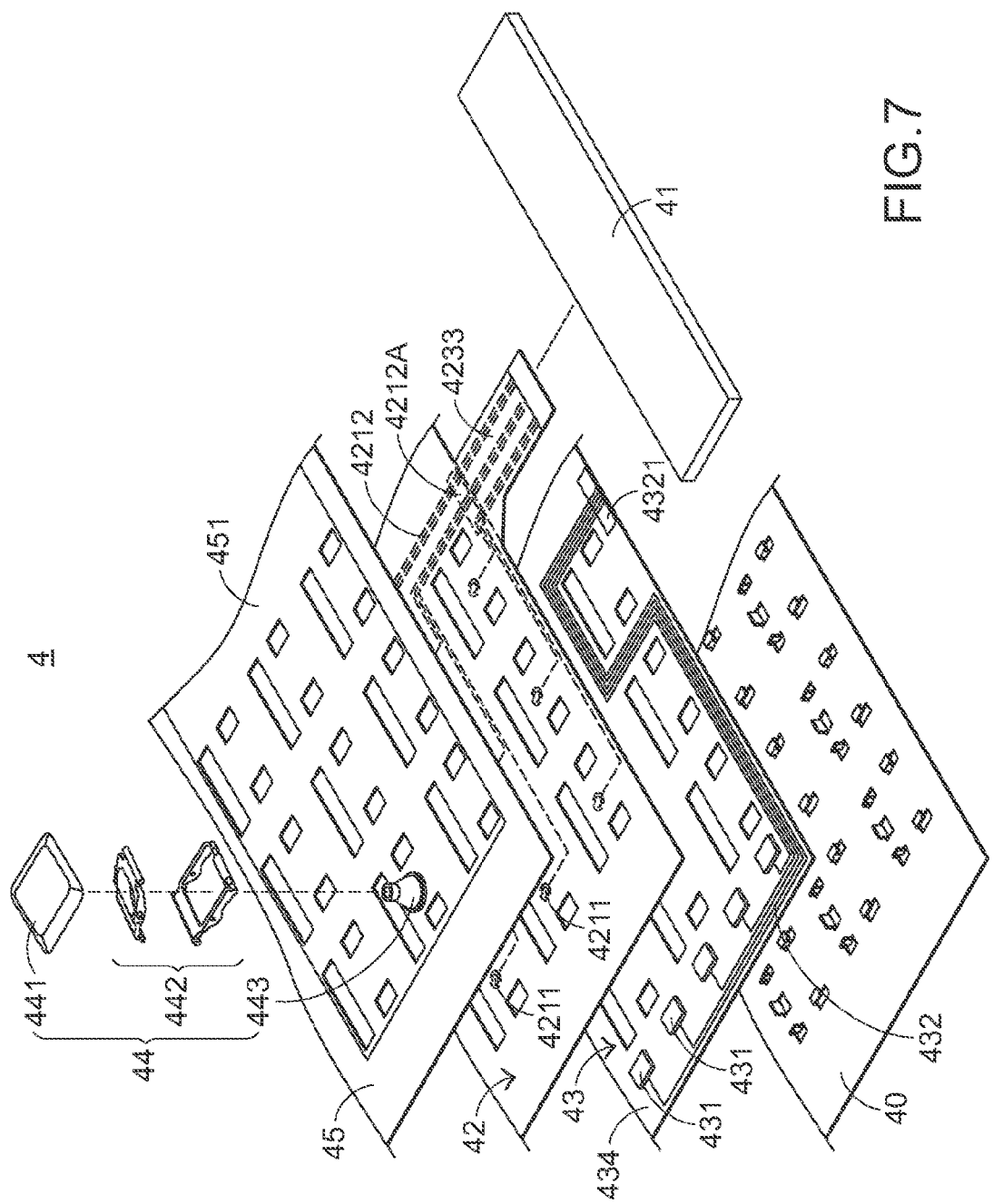
FIG. 7 is a schematic exploded view illustrating a portion of an illuminated keyboard according to a second embodiment of the present invention.

The present invention further provides an illuminated keyboard of a second embodiment. FIG. 7 is a schematic exploded view illustrating a portion of an illuminated keyboard according to a second embodiment of the present invention. As shown in FIG. 7, the illuminated keyboard 4 comprises a base plate 40, a main circuit board 41, a membrane switch circuit module 42, an illumination circuit board 43, plural keys 44 and a elastic film 45. For clarification and brevity, only one key 44 is shown in the drawing. The key 44 comprises a keycap 441, a scissors-type connecting element 442 and an elastic element 443. The configurations and sequences of the base plate 40, the main circuit board 41 and the plural keys 44 of the illuminated keyboard 4 are similar to those illustrated in the first embodiment, and are not redundantly described herein. In this embodiment, the illuminated keyboard 4 further comprises a elastic film 45. A light-shielding layer 451 is disposed on the elastic film 45 for avoiding light leakage. The elastic element 443 is disposed on the light-shielding layer 451. The membrane switch circuit module 42 is disposed under the elastic film 45. The illumination circuit board 43 is disposed under the membrane switch circuit module 42. The main circuit board 41 is disposed beside the membrane switch circuit module 42 and connected with the membrane switch circuit module 42.

Figure 8:
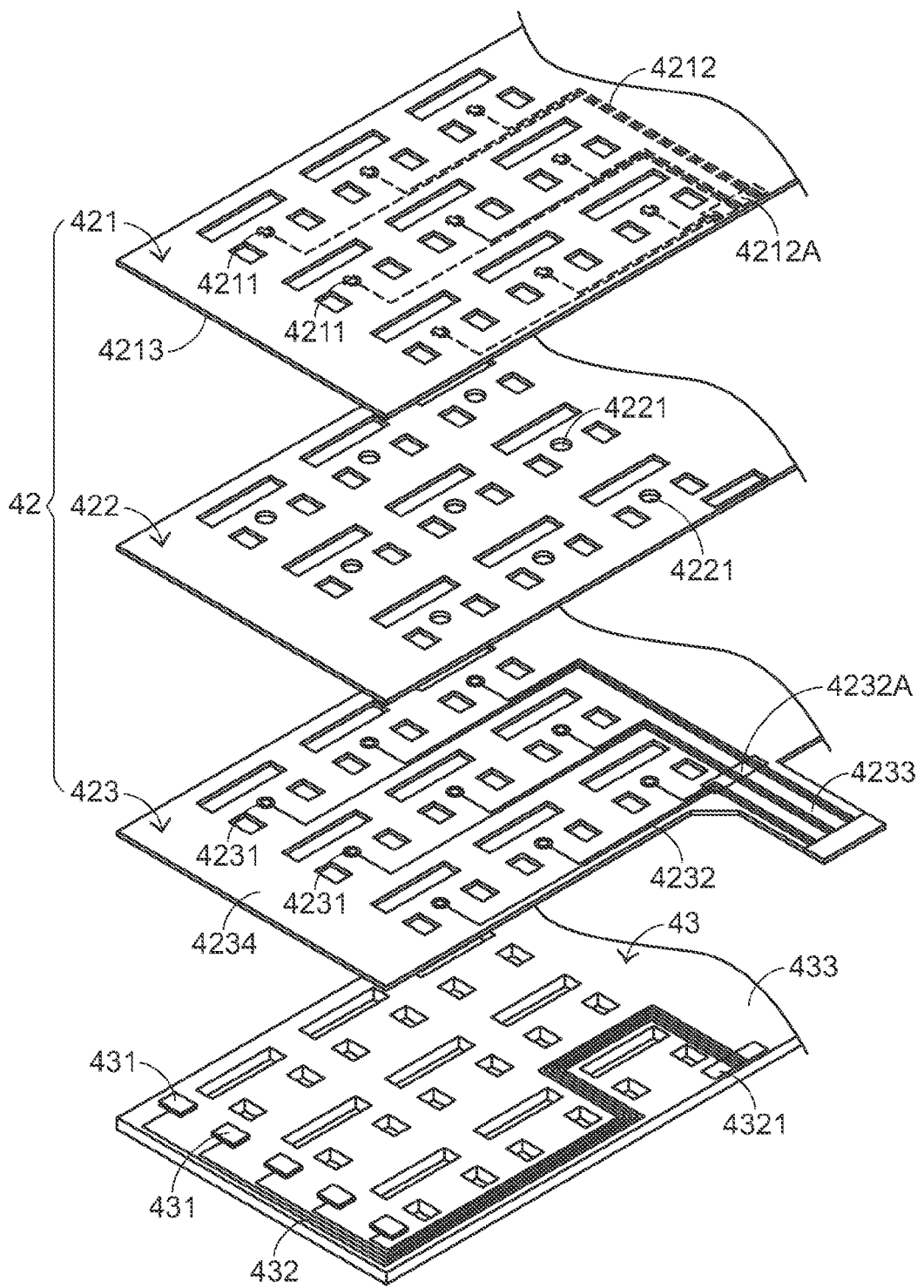
FIG. 8 is a schematic exploded view illustrating the membrane switch circuit module and the illumination circuit board of the illuminated keyboard according to the second embodiment of the present invention.

Hereinafter, the configurations of the membrane switch circuit module 42 and the illumination circuit board 43 will be illustrated with reference to FIG. 8. FIG. 8 is a schematic exploded view illustrating the membrane switch circuit module and the illumination circuit board of the illuminated keyboard according to the second embodiment of the present invention. The illumination circuit board 43 is stacked on the membrane switch circuit module 42, and arranged under the membrane switch circuit module 42. The illumination circuit board 43 comprises plural light sources 431 and a second trace pattern 432. The plural light sources 431 are disposed on a first surface 433 of the illumination circuit board 43 for emitting light beams (not shown). In this embodiment, the first surface 433 of the illumination circuit board 43 is a top surface. The second trace pattern 432 is disposed on the first surface 433 of the illumination circuit board 43 and connected with the light sources 431. In addition, the second trace pattern 432 has a second connecting zone 4321.

Please refer to FIG. 8 again. The membrane switch circuit module 42 comprises an upper wiring board 421, a partition plate 422 and a lower wiring board 423. The upper wiring board 421 comprises plural upper contacts 4211 and a third trace pattern 4212. In addition, the third trace pattern 4212 has a third connecting zone 4212A. The plural upper contacts 4211 and the third trace pattern 4212 are disposed on a bottom surface 4214 of the upper wiring board 421. The lower wiring board 423 is arranged at a side of the upper wiring board 421. The lower wiring board 423 has plural lower contacts 4231 corresponding to respective upper contacts 4211. The lower wiring board 423 also includes a first trace pattern 4232 and a bus bar 4233. The plural lower contacts 4231 and the first trace pattern 4232 are disposed on a top surface 4234 of the lower wiring board 423. Each lower contact 4231 and the corresponding upper contact 4211 collectively define a key intersection. When the membrane switch circuit module 42 is depressed, the lower contact 4231 and the corresponding upper contact 4211 are contacted with each other, and thus a key signal is generated. The first trace pattern 4232 is connected with the plural lower contacts 4231. Moreover, the first trace pattern 4232 has a first connecting zone 4232A. The location of the first connecting zone 4232A corresponds to the location of the third connecting zone 4212A of the upper wiring board 421. The first connecting zone 4232A and the third connecting zone 4212A are in contact with each other, so that a connection loop (not shown) between the upper wiring board 421 and the lower wiring board 423 is established. The bus bar 4233 is connected with the main circuit board 41 and the first trace pattern 4232. On the other hand, the location of the second connecting zone 4321 of the illumination circuit board 43 corresponds to the location of first connecting zone 4232A of the lower wiring board 423. The partition plate 422 has plural perforations 4221 corresponding to the plural upper contacts 4211. When the membrane switch circuit module 42 is depressed, the upper contact 4211 is inserted into a corresponding perforation 4221.

In this embodiment, the membrane switch circuit module 42 and the illumination circuit board 43 are combined together by a compression process. For combining the membrane switch circuit module 42 with the illumination circuit board 43, the first trace pattern 4232 on the top surface 4234 of the lower wiring board 423 is contacted with the second connecting zone 4321 of the illumination circuit board 43 through the first connecting zone 4232A. After the membrane switch circuit module 42 and the illumination circuit board 43 are subject to the compression process, the first connecting zone 4232A of the membrane switch circuit module 42 and the second connecting zone 4321 of the illumination circuit board 43 are jointed together. Meanwhile, the first trace pattern 4232 of the membrane switch circuit module 42 and the second trace pattern 432 of the illumination circuit board 43 are electrically connected with each other. Under this circumstance, the electricity required for operations of the illumination circuit board 43 can be transmitted to the plural light sources 431 through the main circuit 41 (see FIG. 7), the bus bar 4233, the first trace pattern 4232 (including the first connecting zone 4232A) and the second trace pattern 432 (including the second connecting zone 4321).

From the above discussions, in the illuminated keyboard 4 of this embodiment, the second connecting zone 4321 is disposed on the illumination circuit board 43. After the illumination circuit board 43 is stacked on the bottom of the membrane switch circuit module 42, the first connecting zone 4232A of the membrane switch circuit module 42 and the second connecting zone 4321 of the illumination circuit board 43 are jointed together. In such way, since it is not necessary to install an additional bus bar on the illumination circuit board 43 to connect with the main circuit board 41, the fabricating cost of the illuminated keyboard 4 is reduced. Moreover, since the illuminated keyboard 4 of this embodiment can be produced by combining the illumination circuit board 43 having the second connecting zone 4321 and the conventional keyboard, it is not necessary to re-design the mold. That is, the illuminated keyboard 4 of the present invention is cost-effective.

Figure 9:
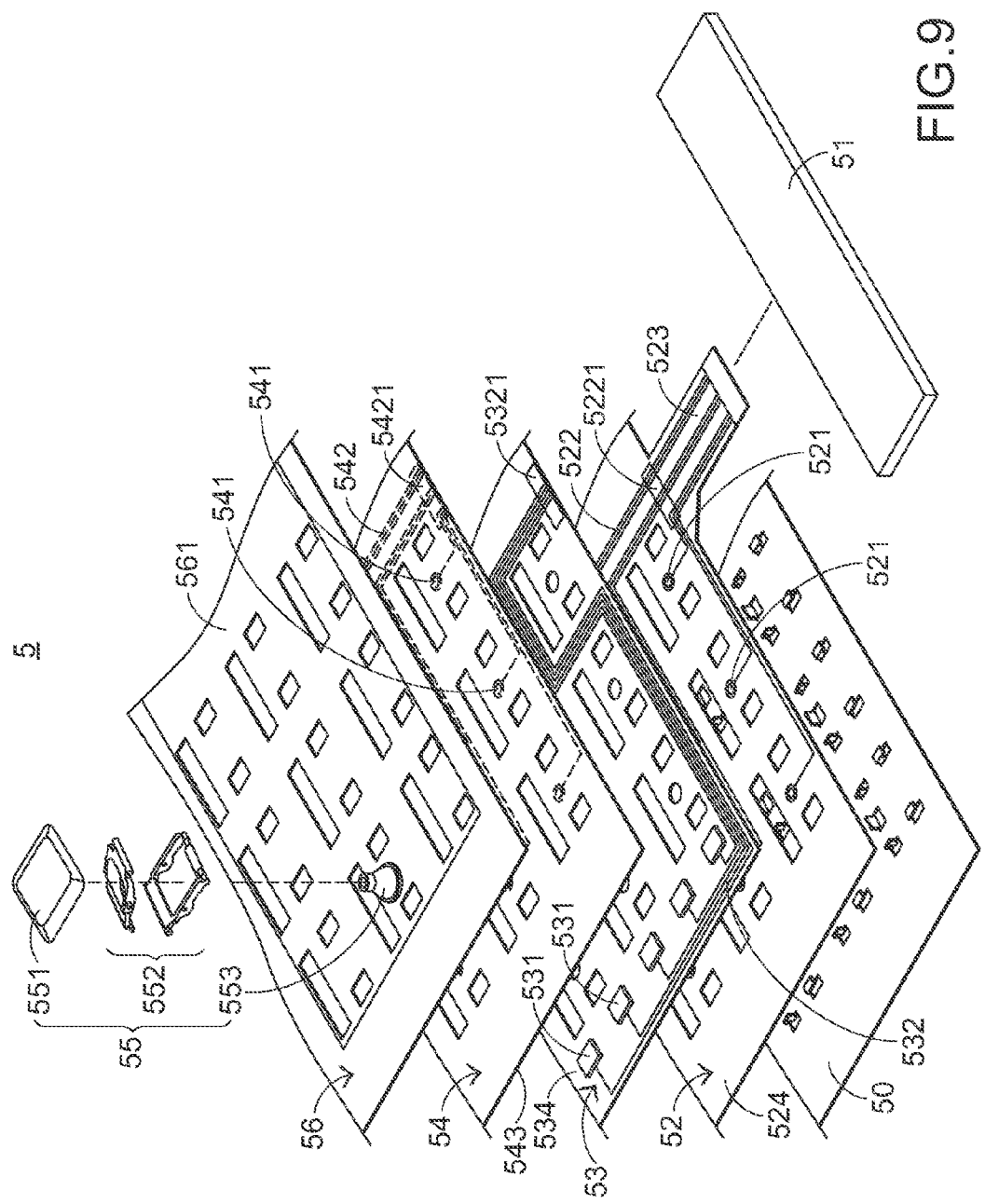
FIG. 9 is a schematic exploded view illustrating a portion of an illuminated keyboard according to a third embodiment of the present invention.

The present invention further provides an illuminated keyboard of a third embodiment. FIG. 9 is a schematic exploded view illustrating a portion of an illuminated keyboard according to a third embodiment of the present invention. As shown in FIG. 9, the illuminated keyboard 5 comprises a base plate 50, a main circuit board 51, a first wiring board 52, an illumination circuit board 53, a second wiring board 54, plural keys 55 and a elastic film 56. For clarification and brevity, only one key 55 is shown in the drawing. The key 55 comprises a keycap 551, a scissors-type connecting element 552 and an elastic element 553. A light-shielding layer 561 is disposed on the elastic film 56 for avoiding light leakage. The elastic element 553 is disposed on the light-shielding layer 561. The configurations and sequences of the base plate 50, the main circuit board 51, the plural keys 55 and the elastic film 56 of the illuminated keyboard 5 are similar to those of the second embodiment, and are not redundantly described herein.

Please refer to FIG. 9 again. The second wiring board 54 is arranged between the elastic film 56 and the illumination circuit board 53. The illumination circuit board 53 is arranged between the second wiring board 54 and the first wiring board 52. The first wiring board 52 is disposed at a side of the second wiring board 54. The first wiring board 52 has plural first contacts 521, a first trace pattern 522 and a bus bar 523. The first trace pattern 522 is connected with the plural first contacts 521. Moreover, the first trace pattern 522 has a first connecting zone 5221. The second wiring board 54 has plural second contacts 541 corresponding to the first contacts 521. The second wiring board 54 also has a third trace pattern 542. The third trace pattern 542 has a third connecting zone 5421. Each second contact 541 and the corresponding first contact 521 collectively define a key intersection. When the second wiring board 54 is depressed, the second contact 541 and the corresponding first contact 521 are contacted with each other, and thus a key signal is generated. The location of the first connecting zone 5221 corresponds to the location of the third connecting zone 5421 of the second wiring board 54. The main circuit board 51 is disposed beside the second wiring board 54. The bus bar 523 is connected with the main circuit board 51 and the first trace pattern 522. In this embodiment, since the first wiring board 52 is a lower wiring board and the first contacts 521 are lower contacts, the first contacts 521 and the first trace pattern 522 are disposed on a top surface 524 of the first wiring board 52. Moreover, since the second wiring board 54 is an upper wiring board and the second contacts 541 are upper contacts, the second contacts 541 and the third trace pattern 542 are disposed on a bottom surface 543 of the second wiring board 54. The illumination circuit board 53 comprises plural light sources 531, a second trace pattern 532 and plural perforations 533. The plural light sources 531 are disposed on a first surface 534 of the illumination circuit board 53 for emitting light beams (not shown). In this embodiment, the first surface 533 of the illumination circuit board 53 is a bottom surface. The second trace pattern 532 is disposed on the first surface 533 of the illumination circuit board 53 and connected with the light sources 531. In addition, the second trace pattern 532 has a second connecting zone 5321. The location of the second connecting zone 5321 corresponds to the location of first connecting zone 5221 of the first wiring board 52. The locations of the plural perforations 531 corresponding to the plural second contacts 541. When the second wiring board 54 is depressed, the second contact 541 is inserted into a corresponding perforation 531.

After the first wiring board 52, the illumination circuit board 53 and the second wiring board 54 are combined together, the first connecting zone 5221 of the first wiring board 52 and the second connecting zone 5321 of the illumination circuit board 53 are jointed together. Meanwhile, the first trace pattern 522 of the first wiring board 52 and the second trace pattern 532 of the illumination circuit board 53 are electrically connected with each other. Under this circumstance, the electricity required for operations of the illumination circuit board 53 can be transmitted to the plural light sources 531 through the main circuit 51, the bus bar 523, the first trace pattern 522 (including the first connecting zone 5221) and the second trace pattern 532 (including the second connecting zone 5321). On the other hand, the first connecting zone 5221 of the first wiring board 52 and the third connecting zone 5421 are in contact with each other, so that a connection loop (not shown) between the second wiring board 54 and the first wiring board 52 is established.

In this embodiment, the first wiring board 52, the illumination circuit board 53 and the second wiring board 54 collectively define a membrane switch circuit module. Moreover, after the first wiring board 52, the illumination circuit board 53 and the second wiring board 54 are combined together by a compression process, the first connecting zone 5221 and the third connecting zone 5421 are jointed together and the first connecting zone 5221 and second connecting zone 5321 are jointed together.

From the above discussion, in the illuminated keyboard 5 of the this embodiment, the illumination circuit board 53 is arranged between the first wiring board 52 and the second wiring board 54, and these three components collectively define the membrane switch circuit module. Since the thickness of the partition plate is saved, the overall internal height of the illuminated keyboard 5 is reduced.

The present invention further provides an illuminated keyboard of a fourth embodiment. FIG. 10 is a schematic exploded view illustrating a portion of an illuminated keyboard according to a fourth embodiment of the present invention. As shown in FIG. 10, the illuminated keyboard 6 comprises a base plate 60, a main circuit board 61, a first wiring board 62, an illumination circuit board 63, a second wiring board 64, plural keys 65 and a elastic film 66. For clarification and brevity, only one key 65 is shown in the drawing. The key 65 comprises a keycap 651, a scissors-type connecting element 652 and an elastic element 653. A light-shielding layer 661 is disposed on the elastic film 66 for avoiding light leakage. The elastic element 653 is disposed on the light-shielding layer 661. Except for the structure of illumination circuit board 63 and the locations of the first wiring board 62 and the second wiring board 64, the configurations and sequences of the components of the illuminated keyboard 6 are similar to those of the illuminated keyboard 5 of the third embodiment.

Please refer to FIG. 10 again. The first wiring board 62 is disposed at a side of the second wiring board 64. The first wiring board 62 has plural first contacts 621, a first trace pattern 622 and a bus bar 623. The first trace pattern 622 is connected with the plural first contacts 621. Moreover, the first trace pattern 622 has a first connecting zone 6221. The second wiring board 64 has plural second contacts 641 corresponding to the plural first contacts 621. The second wiring board 64 also has a third trace pattern 642. The third trace pattern 642 has a third connecting zone 6421. The illumination circuit board 63 comprises plural light sources 631, a second trace pattern 632 and plural perforations 633. In addition, the second trace pattern 632 has a second connecting zone 6321. The location of the second connecting zone 6321 corresponds to the location of first connecting zone 6221 of the first wiring board 62. The configurations and functions of the plural light sources 631, the second trace pattern 632 and the plural perforations 633 are substantially similar to those of the illuminated keyboard 5 of the third embodiment, and are not redundantly described herein. However, in this embodiment, the second trace pattern 632 is disposed on a first surface 634 of the illumination circuit board 63. The second trace pattern 632 is a top surface.

In this embodiment, the first wiring board 62 is arranged between the elastic film 66 and the illumination circuit board 63. The illumination circuit board 63 is arranged between the first wiring board 62 and the second wiring board 64. The plural first contacts 621 and the first trace pattern 622 are disposed on a bottom surface 624 of the first wiring board 62. The plural second contacts 641 and the third trace pattern 642 are disposed on a top surface 643 of the second wiring board 64. In other words, the first wiring board 62 is an upper wiring board, and the second wiring board 64 is a lower wiring board. The process of combining the first wiring board 62, the illumination circuit board 63 and the second wiring board 64 is similar to that of the illuminated keyboard 5 of the third embodiment, and is not redundantly described herein.

From the above description, in the illuminated keyboard of the present invention, after the second connecting zone of the illumination circuit board and the first connecting zone of the membrane switch circuit module or the first wiring board are jointed together, the second trance pattern of the illumination circuit board and the first trace pattern of the membrane switch circuit module or the first wiring board are connected with each other. As a consequence, the first trace pattern of the membrane switch circuit module or the first wiring board is connected with the main circuit board to acquire electricity without the need of installing an additional bus bar on the illumination circuit board. Since it is not necessary to install an additional bus bar on the illumination circuit board, the fabricating cost of the illuminated keyboard is reduced. Moreover, since no additional bus bar is included in the illumination circuit board and the second trace pattern is no longer connected with the bus bar, only the circuitry for connecting the second connecting zone is needed to be designed in the illumination circuit board. That is, the circuitry layout of the illumination circuit board is simplified and the circuitry can be easily designed. Moreover, according to the practical requirements, the arrangement of the components included in the illuminated keyboard of the present invention may be modified or varied. For example, the structure and function of the flexible member may be integrated into the illumination circuit board, or the partition plate is integrated into the illumination circuit board. Since the thickness of the elastic film or the partition plate is saved, the overall internal height of the illuminated keyboard is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illuminated keyboard, comprising:
   a main circuit board;
   a membrane switch circuit module connected with said main circuit board, and comprising at least one key intersection, a first trace pattern and a bus bar, wherein when said at least one key intersection is triggered, a key signal is generated, wherein said first trace pattern is connected with said at least one key intersection and has a first connecting zone, wherein said bus bar is connected with said main circuit board and said first trace pattern, wherein said membrane switch circuit module further comprises:
   an upper wiring board having at least one upper contact, wherein said first trace pattern, said first connecting zone and said bus bar are disposed on said upper wiring board;
   a lower wiring board arranged at a side of said upper wiring board, and comprising at least one lower contact corresponding to said at least one upper contact and a third trace pattern, wherein said at least one upper contact and said at least one lower contact collectively define said at least one key intersection, wherein when said membrane switch circuit module is depressed, said upper contact and said lower contact are contacted with each other, so that said key signal is generated, wherein said third trace pattern further comprises a third connecting zone, and said third connecting zone and said first connecting zone are in contact with each other, so that a connection loop between said upper wiring board and said lower wiring board is established; and
   a partition plate arranged between said upper wiring board and said lower wiring board, and having at least one perforation corresponding to said at least one upper contact, wherein when said membrane switch circuit module is depressed, said at least one upper contact is inserted into said perforation;
   an illumination circuit board stacked on said membrane switch circuit module and comprising at least one light source and a second trace pattern, wherein said light source is disposed on a first surface of said illumination circuit board for emitting light beams, and said second trace pattern is disposed on said first surface of said illumination circuit board and connected with said light source, wherein said second trace pattern has a second connecting zone; and
   at least one key disposed over said membrane switch circuit module and aligned with said at least one key intersection, wherein when said at least one key is depressed, said membrane switch circuit module is triggered, wherein said first connecting zone and said second connecting zone are in contact with each other, so that electricity is transmitted to said illumination circuit board through said bus bar, said first trace pattern and said second trace pattern.

2. The illuminated keyboard according to claim 1 wherein said membrane switch circuit module and said illumination circuit board are combined together by a compression process, so that said first connecting zone and said second connecting zone are jointed together.

3. The illuminated keyboard according to claim 1 further comprising a conductive film, which is disposed on said first connecting zone or said second connecting zone, wherein during said membrane switch circuit module and said illumination circuit board are combined together by a thermal compression process, said conductive film is thermally molten, so that said first connecting zone and said second connecting zone are jointed together via said conductive film.

4. The illuminated keyboard according to claim 1 further comprising an elastic film, wherein said illumination circuit board further comprises a light-shielding layer, wherein said light-shielding layer is disposed on a second surface of said illumination circuit board for avoiding light leakage, and said elastic film is disposed on said light-shielding layer.

5. The illuminated keyboard according to claim 1 further comprising a base plate for supporting said membrane switch circuit module and said at least one key, wherein said at least one key comprises:
   at least one keycap exposed to a surface of said illuminated keyboard;
   at least one scissors-type connecting element arranged between said base plate and said at least one keycap for connecting said base plate with said at least one keycap, and allowing said at least one keycap to be moved upwardly and downwardly with respect to said base plate; and
   at least one elastic element disposed on a second surface of said illumination circuit board, wherein when said at least one keycap is depressed, said at least one elastic element is compressed to push against said membrane switch circuit module, so that said membrane switch circuit module is triggered, wherein when a depressing force exerted on said at least one keycap is eliminated, an elastic force provided by said at least one elastic element is acted on said at least one keycap, so that said at least one keycap is returned to an original position.

6. An illuminated keyboard, comprising:
   a main circuit board;
   a membrane switch circuit module connected with said main circuit board, and comprising at least one key intersection, a first trace pattern and a bus bar, wherein when said at least one key intersection is triggered, a key signal is generated, wherein said first trace pattern is connected with said at least one key intersection and has a first connecting zone, wherein said bus bar is connected with said main circuit board and said first trace pattern, wherein said membrane switch circuit module further comprises:

an upper wiring board having at least one upper contact and a third trace pattern, wherein said third trace pattern has a third connecting zone;

a lower wiring board arranged at a side of said upper wiring board, and comprising at least one lower contact corresponding to said at least one upper contact, wherein said at least one upper contact and said at least one lower contact collectively define said at least one key intersection, wherein when said membrane switch circuit module is depressed, said upper contact and said lower contact are contacted with each other, so that said key signal is generated, wherein said third trace pattern further comprises a third connecting zone, and said third connecting zone and said first connecting zone are in contact with each other, so that a connection loop between said upper wiring board and said lower wiring board is established; and a partition plate arranged between said upper wiring board and said lower wiring board, and having at least one perforation corresponding to said at least one upper contact, wherein when said membrane switch circuit module is depressed, said at least one upper contact is inserted into said perforation;

an illumination circuit board stacked on said membrane switch circuit module and comprising at least one light source and a second trace pattern, wherein said light source is disposed on a first surface of said illumination circuit board for emitting light beams, and said second trace pattern is disposed on said first surface of said illumination circuit board and connected with said light source, wherein said second trace pattern has a second connecting zone; and at least one key disposed over said membrane switch circuit module and aligned with said at least one key intersection, wherein when said at least one key is depressed, said membrane switch circuit module is triggered, wherein said first connecting zone and said second connecting zone are in contact with each other, so that electricity is transmitted to said illumination circuit board through said bus bar, said first trace pattern and said second trace pattern.

7. An illuminated keyboard, comprising:

a main circuit board;

a first wiring board comprising at least one first contact, a first trace pattern and a bus bar, wherein said first trace pattern has a first connecting zone, wherein said first contact and said first trace pattern are connected with said bus bar, and said bus bar is connected with said main circuit board;

a second wiring board disposed at a side of said first wiring board and having a second contact corresponding to said first contact, wherein when said first wiring board or said second wiring board is depressed, said second contact is contacted with said first contact, wherein said second wiring board further comprises a third trace pattern, and said third trace pattern has a third connecting zone, wherein said third connecting zone and said first connecting zone are in contact with each other, so that a connection loop between said first wiring board and said second wiring board is established;

an illumination circuit board arranged between said first wiring board and said second wiring board, wherein said illumination circuit board, said first wiring board and said second wiring board collectively define a membrane switch circuit module, wherein said illumination circuit board comprises at least one perforation corresponding to said first contact, at least one light source and a second trace pattern, wherein when said membrane switch circuit module is depressed, said first contact or said second contact is inserted into said perforation, wherein said light source is disposed on a first surface of said illumination circuit board for emitting light beams, and said second trace pattern is disposed on said first surface of said illumination circuit board and connected with said light source, wherein said second trace pattern has a second connecting zone; and at least one key disposed over said first wiring board and aligned with said at least one first contact, wherein when said at least one key is depressed, said first wiring board is triggered, wherein said first connecting zone and said second connecting zone are in contact with each other, so that electricity is transmitted to said illumination circuit board through said bus bar, said first trace pattern and said second trace pattern.

8. The illuminated keyboard according to claim 7 wherein said first wiring board and said illumination circuit board are combined together by a compression process, so that said first connecting zone and said second connecting zone are jointed together.

9. The illuminated keyboard according to claim 7 further comprising a conductive film, which is disposed on said first connecting zone or said second connecting zone, wherein during said first wiring board and said illumination circuit board are combined together by said thermal compression process, said conductive film is thermally molten, so that said first connecting zone and said second connecting zone are jointed together via said conductive film.

10. The illuminated keyboard according to claim 7 wherein said first wiring board is an upper wiring board, and said second wiring board is a lower wiring board.

11. The illuminated keyboard according to claim 7 wherein said first wiring board is a lower wiring board, and said second wiring board is an upper wiring board.

12. The illuminated keyboard according to claim 7 further comprising a base plate for supporting said first wiring board, said second wiring board and said at least one key, wherein said at least one key comprises:

at least one keycap exposed to a surface of said illuminated keyboard;

at least one scissors-type connecting element arranged between said base plate and said at least one keycap for connecting said base plate with said at least one keycap, and allowing said at least one keycap to be moved upwardly and downwardly with respect to said base plate; and at least one elastic element disposed on an elastic film of said illuminated keyboard, wherein when said at least one keycap is depressed, said at least one elastic element is compressed to push against said first wiring board or said second wiring board, so that said first wiring board or said second wiring board is triggered, wherein when a depressing force exerted on said at least one keycap is eliminated, an elastic force provided by said at least one elastic element is acted on said at least one keycap, so that said at least one keycap is returned to an original position.

13. The illuminated keyboard according to claim 6 wherein said membrane switch circuit module and said illumination circuit board are combined together by a compression process, so that said first connecting zone and said second connecting zone are jointed together.

14. The illuminated keyboard according to claim 6 further comprising a conductive film, which is disposed on said first connecting zone or said second connecting zone, wherein during said membrane switch circuit module and said illumination circuit board are combined together by a thermal compression process, said conductive film is thermally molten, so that said first connecting zone and said second connecting zone are jointed together via said conductive film.

15. The illuminated keyboard according to claim 6 further comprising an elastic film, wherein said illumination circuit board further comprises a light-shielding layer, wherein said light-shielding layer is disposed on a second surface of said illumination circuit board for avoiding light leakage, and said elastic film is disposed on said light-shielding layer.

16. The illuminated keyboard according to claim 6 further comprising a base plate for supporting said membrane switch circuit module and said at least one key, wherein said at least one key comprises:
   at least one keycap exposed to a surface of said illuminated keyboard;
   at least one scissors-type connecting element arranged between said base plate and said at least one keycap for connecting said base plate with said at least one keycap, and allowing said at least one keycap to be moved upwardly and downwardly with respect to said base plate; and
   at least one elastic element disposed on a second surface of said illumination circuit board, wherein when said at least one keycap is depressed, said at least one elastic element is compressed to push against said membrane switch circuit module, so that said membrane switch circuit module is triggered, wherein when a depressing force exerted on said at least one keycap is eliminated, an elastic force provided by said at least one elastic element is acted on said at least one keycap, so that said at least one keycap is returned to an original position.

* * * * *